(12) United States Patent
Reevell (10) Patent No.: US 10,653,182 B2
(45) Date of Patent: May 19, 2020

(54) ELECTRONIC CIGARETTE WITH VISIBLE LIQUID CONTAINER

(71) Applicant: Altria Client Services LLC, Richmond, VA (US)

(72) Inventor: Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 794 days.

(21) Appl. No.: 15/264,901

(22) Filed: Sep. 14, 2016

(65) Prior Publication Data

US 2017/0071254 A1 Mar. 16, 2017

Related U.S. Application Data

(63) Continuation of application No. PCT/EP2016/070241, filed on Aug. 26, 2016.

(30) Foreign Application Priority Data

Sep. 16, 2015 (EP) ..................... 15185563

(51) Int. Cl.
*A24F 47/00* (2020.01)
*H05B 1/02* (2006.01)
(Continued)

(52) U.S. Cl.
CPC .......... *A24F 47/008* (2013.01); *B29D 22/003* (2013.01); *B65D 25/56* (2013.01);
(Continued)

(58) Field of Classification Search
CPC ..... A24F 47/008; B29D 22/003; B65D 25/56; H05B 1/0244; H05B 3/44; H05B 2203/014; H05B 2203/021; H05B 2203/022
See application file for complete search history.

(56) References Cited

U.S. PATENT DOCUMENTS

| | | | |
|---|---|---|---|
| 8,528,569 B1 | 9/2013 | Newton | |
| 2008/0223126 A1* | 9/2008 | Geschwender | G01W 1/14 73/170.17 |

(Continued)

FOREIGN PATENT DOCUMENTS

| | | |
|---|---|---|
| CN | 203762287 | 8/2014 |
| CN | 104126873 A | 11/2014 |

(Continued)

OTHER PUBLICATIONS

European Search Report for Application No. 15185563.2 dated May 3, 2016.

(Continued)

*Primary Examiner* — Dana Ross
*Assistant Examiner* — James F Sims, III
(74) *Attorney, Agent, or Firm* — Harness, Dickey & Pierce, P.L.C.

(57) ABSTRACT

A liquid storage portion for an aerosol-generating system includes a container configured to hold a liquid aerosol-forming substrate. The container has an opening for dispensing the liquid aerosol-forming substrate, and includes at least one transparent wall portion, such that the liquid level in the container can be visually monitored by the vaper. The container is further configured such that the liquid aerosol-forming substrate is held in a contiguous volume area of the container. The aerosol-forming substrate in the contiguous volume is confined near the dispensing opening of the container without regard to the orientation of the liquid storage portion.

5 Claims, 10 Drawing Sheets

(51) Int. Cl.
*B65D 25/56* (2006.01)
*B29D 22/00* (2006.01)
*H05B 3/44* (2006.01)

(52) U.S. Cl.
CPC ............. *H05B 1/0244* (2013.01); *H05B 3/44* (2013.01); *H05B 2203/014* (2013.01); *H05B 2203/021* (2013.01); *H05B 2203/022* (2013.01)

(56) References Cited

U.S. PATENT DOCUMENTS

| | | | |
|---|---|---|---|
| 2011/0094523 | A1 | 4/2011 | Thorens et al. |
| 2013/0192623 | A1* | 8/2013 | Tucker .................. H01C 17/00 131/329 |
| 2013/0228191 | A1 | 9/2013 | Newton |
| 2015/0189919 | A1 | 7/2015 | Liu |
| 2016/0270442 | A1* | 9/2016 | Liu ........................ A24F 47/008 |
| 2017/0196264 | A1* | 7/2017 | Liu ........................ A24F 47/008 |
| 2018/0228216 | A1* | 8/2018 | Saygili .................. A24F 47/008 |

FOREIGN PATENT DOCUMENTS

| | | |
|---|---|---|
| DE | 202014106041 U1 | 1/2015 |
| EP | 2719416 | 4/2014 |
| RU | 2517125 C2 | 5/2014 |
| WO | WO-2015071703 | 5/2015 |

OTHER PUBLICATIONS

"Clearo Fitted for You," Janty, 2017 1-6 https://www.janty.com/clearo.
"Vype ePen Starter Kit," Vype, 2016,1-7.https://www.govype.com/uk/e-cig-epen-starter-kit.
"Blu PRO Clearomiser (generation 2015)," blu, 2016, 1-5, https://www.blu.com/en/GB/blu-clearomiser.html.
VIP Premium Vaping and E-Liquids, "Photon Bronze Kit" VIP Elecrtronic Cigarette, 2017, 1-3, https://www.vipelectroniccigarette.co.uk/photon-tank-bronze-full-kit.html.
Smoore Electronic Cigarette Manufacture, "E-Shisha" Smoore E-Cig, 2017, 1-2, http://www.smoorecig.com.
Kimree.com, EKMIZER 2 Electronic Cigarette, 2017, 1-2, http://www.kimree.com/products/EKMIZER/EKMIZER-2.html.
VaporQueen, Smallest Refillable E-cigarette and Vaporizer, Kimree.com, 2017, 1-3, http://www.kimree.com/products/Vapor/VaporQueen.html.
International Preliminary Report on Patentability dated Sep. 15, 2017 for Application No. PCT/EP2016/070241.
International Search Report for international application No. PCT/EP2016/070241 dated Aug. 26, 2016.
International Search Report for international application No. PCT/EP2016/070241 dated Dec. 12, 2016.
Russian Search Report for corresponding Application No. 2018113470, dated Sep. 26, 2019.
Russian Decision to Grant for corresponding Application No. 2018113470, dated Sep. 26, 2019.

* cited by examiner

ELECTRONIC CIGARETTE WITH VISIBLE LIQUID CONTAINER

This is a continuation of and claims priority to PCT/EP2016/070241 filed on Aug. 26, 2016, and further claims priority to EP 15185563.2 filed on Sep. 16, 2015; both of which are hereby incorporated by reference in their entirety.

BACKGROUND

At least one example embodiment relates to a liquid storage portion for aerosol-generating systems. The liquid storage portion comprises a container for holding liquid aerosol-generating substrate and an opening for dispensing the liquid aerosol-generating substrate. The liquid storage portion is particularly suitable for handheld electrically operated vaping systems.

One type of aerosol-generating system is an electrically operated vaping system. Handheld electrically operated vaping systems are known that consist of a device portion comprising a battery and control electronics, a cartridge portion comprising a supply of aerosol-forming substrate held in a liquid storage portion, and an electrically operated vaporizer. A cartridge comprising both a supply of aerosol-forming substrate held in the liquid storage portion and a vaporizer is sometimes referred to as a "cartomizer". The vaporizer typically comprises a coil of heater wire wound around an elongate wick soaked in the liquid aerosol-forming substrate held in the liquid storage portion. The cartridge portion may comprise the supply of aerosol-forming substrate, an electrically operated vaporizer, and a mouthpiece, on which the vaper draws.

It may be difficult to determine the remaining amount of aerosol generating substrate in the liquid storage portion of an electronic cigarette.

U.S. Pat. No. 8,528,569 B1 discloses an electrically operated aerosol-generating system comprising a liquid storage portion for storing liquid aerosol-forming substrate and an electric heater comprising a heater coil for heating the liquid aerosol-forming substrate. A wick is provided which conveys the liquid aerosol-generating substrate to the heater coil. An electric circuitry is provided, which activates the heater coil when a vaper draws a puff at the electronic cigarette. The liquid storage portion comprises a window, which allows a vaper to visually inspect the remaining fill level of the liquid aerosol-generating substrate. In order to determine the remaining fill level the electronic cigarette has to be held in a specific orientation.

It would therefore be desirable to provide an aerosol-generating system that allows a vaper to determine the remaining amount of aerosol-forming substrate in the liquid storage portion, at any time and without the need that the aerosol-generating system is held in a specific orientation.

SUMMARY

According to at least one example embodiment, a liquid storage portion for an aerosol-generating system comprises a container for holding a liquid aerosol-forming substrate. The container has an opening for dispensing the liquid aerosol-forming substrate, and further comprises at least one transparent wall portion, such that the liquid level in the container can be visually monitored. The container is configured such that the liquid aerosol-forming substrate is held in a contiguous volume area of the liquid container, wherein the aerosol-forming substrate in the contiguous volume is kept confined near the dispensing opening of the liquid container independent from the orientation of the liquid storage portion.

The term "contiguous volume area" denotes a continuous and coherent volume area that is occupied by the liquid aerosol-forming substrate comprised in the container. The container is formed in such way that the liquid substrate is not free to move around, but is captured in the contiguous volume area. The size of this contiguous volume area decreases with progressing consumption of the liquid aerosol-forming substrate. The contiguous volume area extends from the dispensing opening of the container portion and the extension area of the contiguous volume area so as to indicate a remaining amount of liquid aerosol-forming substrate comprised in the container portion.

In at least one example embodiment, the container is formed such that the liquid aerosol-forming substrate is held in the contiguous volume area by capillary forces. To this end at least a section of the container has a width dimension below a desired (or alternatively predefined) value. This desired (or alternatively predefined) value depends on the materials used for the container as well as on the physical and chemical properties of the liquid aerosol-forming substrate. In some embodiments the width dimension may be below about 2 millimeters, below about 0.5 millimeters, or below about 0.25 millimeters. Use of capillary forces represents a simple and reliable method for holding the liquid aerosol-forming substrate in a well-defined and contiguous volume area.

The liquid aerosol-forming substrate which is contained in the container may have a viscosity such that the liquid aerosol-forming substrate is held near the dispensing opening of the container. In more detail, the viscosity of the liquid aerosol-forming substrate may range from about 17 to about 86 millipascal seconds (mPa-s), about 25 to about 70 mPa-s, or about 35 to about 55 mPa-s For example, the viscosity may be about 45 mPa-s. By providing a liquid aerosol-forming substrate with such a viscosity together with providing a container with width dimensions as specified above, the liquid aerosol-generating substrate may be kept confined near the dispensing opening of the container and not slosh back and forth in the container.

It is understood that by heavily shaking the container, the capillary forces might be overcome, such that the fluid is dispersed within the container. However, under normal handling conditions, capillary forces are sufficiently strong to hold the liquid aerosol-forming substrate in a contiguous volume area. In at least one example embodiment, such normal handling conditions are assumed.

In at least one example embodiment, the shape of the container is rectangular or cylindrical and a section of the container has a width dimension, such that the liquid aerosol forming substrate is held by capillary forces in the contiguous volume area. In some example embodiments the width dimension is below about 2 millimeters, below about 0.5 millimeters, or below about 0.25 millimeters.

The container may have a total internal volume of up to about 5 milliliters, up to about 2.5 milliliters, or up to about 1 milliliter.

The container may also consist of one or more capillary channels that extend from the dispensing opening. The liquid aerosol-forming substrate is stored in the volume area of the one or more capillary channels that extend from the dispensing opening. As the cross-section of the individual channels is reduced, the strength of the capillary forces that act on the stored aerosol-forming substrate in the container is increased. The parallel channels may all be connected to each other in the vicinity of the dispensing opening of the container, such that the liquid substrate is homogenously dispensed from all capillary channels and the container is homogenously emptied. Again, the liquid aerosol-forming substrate is released through the dispensing opening to a vaporizer device. As the liquid aerosol-forming substrate is consumed, the "fill level" of the liquid aerosol-forming substrate in the capillary channel(s) decreases. By visual inspection of the fill level of the liquid aerosol-forming substrate in the capillary channel(s) the vaper can obtain information on the remaining content of the container portion of the aerosol generating article.

The liquid storage portion may comprise a single capillary channel that defines a liquid path extending from the opening of the container. The single capillary channel may define a snaking or serpentine liquid path. The smaller the cross-section of the capillary channel, the more pronounced are the changes of the fill level of the liquid aerosol-forming substrate in the capillary channel.

The cross section of the capillary channels may be circular, ellipsoid, triangular, rectangular, or any other suitable shape. The cross-sectional area of the capillary channels should be sufficiently small, such that sufficiently strong capillary forces are present. At the same time the cross-sectional area of the capillary channels should be sufficiently large such that a suitable amount of liquid aerosol-forming liquid can be stored in the container. As discussed above, the optimum size of the container portion may depend on plural factors like dimensional requirements of the aerosol-generating system and properties of the liquid substrate to be used. However, in general the cross-sectional area of the capillary channel is below about 4 square millimeters, below about 1 square millimeter, or below about 0.5 square millimeter.

In at least one example embodiment, in order to increase readability of the fill level, the capillary channel of the liquid storage portion may comprise enlarged pockets that are distributed over the length of the capillary channel. By counting the number of the filled pockets, the vaper can readily determine the remaining content of liquid aerosol-forming substrate in the container.

At least one example embodiment relates to an aerosol-generating system comprising a liquid storage portion as described above.

The aerosol-generating system may comprise a housing that encloses the liquid storage portion. The housing comprises a transparent portion such that the liquid level in the container can be visually monitored from the outside. As the liquid is held in a contiguous volume area, there is no need for the vaper to hold the aerosol-generating system in a desired (or, alternatively a predetermined) orientation. Instead, without regard to the current orientation of the aerosol generating article, the actual fill level of the liquid aerosol-forming substrate can be determined.

The transparent portion of the housing or the transparent portion of the container may comprise a scale for determination of the fill level of the liquid aerosol-forming substrate in the container.

Instead or in addition to the scale, the aerosol-generating system may also comprise magnification areas to facilitate reading of the liquid fill level of the container. These magnification areas are provided to the transparent portion of the container portion or of the housing. The magnification areas may have any shape and are suitable lense-shaped, convex or concave portions attached to the transparent portions of the container or the housing. The magnification areas may be circular structures or elongate semi-cylindrical bars.

At least one example embodiment relates to a method for manufacture of a liquid storage portion for an aerosol-generating system. The method comprises the steps of forming a container having a dispensing opening and providing liquid aerosol-forming substrate to the container. The container is configured such that the liquid aerosol-forming substrate is held in a contiguous volume area of the container that extends from the opening of the container without regard to the orientation of the liquid storage portion. The container is formed such that it exhibits a section having a width dimension, such that the liquid aerosol forming substrate is held by capillary forces in the contiguous volume area.

The container may be manufactured from any suitable material and is preferably made from synthetic material, and may be formed by injection molding or extrusion.

The liquid storage portion may be manufactured by providing a central container portion with a plurality of parallel channels extending along the whole length of the central container portion. End sections are attached to the central container portion, such that adjacent parallel channels are linearly connected with each other, whereby a single snaking liquid path is formed that extends continuously from the dispensing opening of the container portion.

The liquid storage portion may also be manufactured by providing a central container portion that defines a single liquid path with a plurality of enlarged pocket sections that are provided along the length of the liquid path. A front cover plate and a back cover plate may be attached to the central container portion, such that a container portion with a single capillary channel comprising a plurality of enlarged pockets is defined.

The individual parts of the container may be connected to each other by gluing or by ultrasonic welding.

The system may further comprise electric circuitry connected to the heater assembly and to an electrical power source. The electric circuitry is configured to monitor the electrical resistance of the heater assembly or of one or more filaments of the heater assembly, and to control the supply of power to the heater assembly dependent on the electrical resistance of the heater assembly or the one or more filaments.

The electric circuitry may comprise a microprocessor, which may be a programmable microprocessor. The electric circuitry may comprise further electronic components. The electric circuitry may be configured to regulate a supply of power to the heater assembly. Power may be supplied to the heater assembly continuously following activation of the system or may be supplied intermittently, such as on a puff-by-puff basis. The power may be supplied to the heater assembly in the form of pulses of electrical current.

The system comprises a power supply, such as a battery, within the main body of the housing. As an alternative, the power supply may be another form of charge storage device such as a capacitor. The power supply may require recharging and may have a capacity that allows for the storage of enough energy for one or more vaping experiences. For example, the power supply may have sufficient capacity to allow for the continuous generation of aerosol for a period of about six minutes or for a period that is about a multiple of six minutes. In another example, the power supply may have sufficient capacity to allow for a desired (or, alternatively a predetermined) number of puffs or discrete activations of the heater assembly.

The aerosol-forming substrate is a substrate capable of releasing volatile compounds that can form an aerosol (or vapor). The volatile compounds may be released by heating the aerosol-forming substrate. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material. The aerosol-forming substrate may comprise homogenised tobacco material. The aerosol-forming substrate may comprise at least one aerosol-former. The aerosol-forming substrate may comprise other additives and ingredients, such as flavorants.

The aerosol-generating system may comprise a main unit and a cartridge that is removably coupled to the main unit. The liquid storage portion and heater assembly are provided in the cartridge and the main unit comprises a power supply.

The aerosol-generating system may be an electrically operated vaping system. Preferably, the aerosol-generating system is portable. The aerosol-generating system may have a size comparable to a cigar or cigarette. The vaping system may have a total length ranging from about 30 millimeters to about 150 millimeters. The vaping system may have an external diameter ranging from about 5 millimeters to about 30 millimeters.

Features described in relation to one aspect may equally be applied to other aspects of the invention.

BRIEF DESCRIPTION OF THE DRAWINGS

Embodiments will now be described, by way of example only, with reference to the accompanying drawings in which.

DETAILED DESCRIPTION

Various example embodiments will now be described more fully with reference to the accompanying drawings in which some example embodiments are shown. However, specific structural and functional details disclosed herein are merely representative for purposes of describing example embodiments. Thus, the embodiments may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope.

In the drawings, the thicknesses of layers and regions may be exaggerated for clarity, and like numbers refer to like elements throughout the description of the figures.

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," if used herein, specify the presence of stated features, integers, steps, operations, elements and/or components, but do not preclude the presence or addition of one or more other features, integers, steps, operations, elements, components and/or groups thereof.

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In order to more specifically describe example embodiments, various features will be described in detail with reference to the attached drawings. However, example embodiments described are not limited thereto.

Figure 1A:
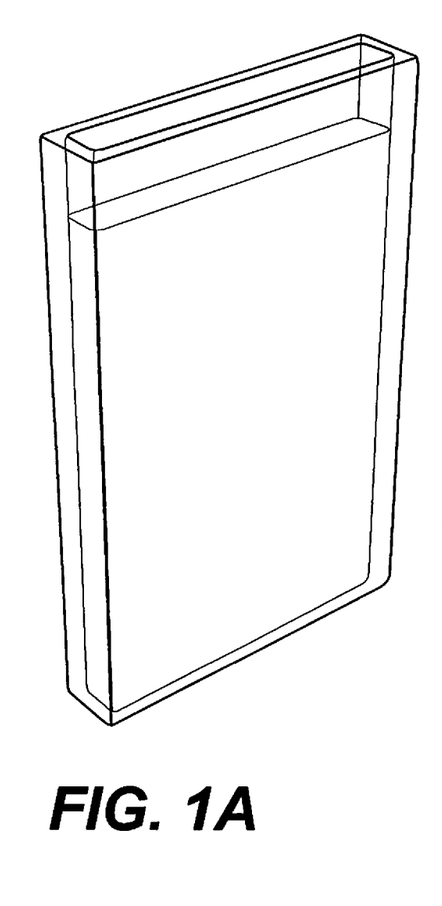
FIGS. 1a and 1b show liquid storage portion with a rectangular container having narrow width according to at least one example embodiment.
Figure 1B:
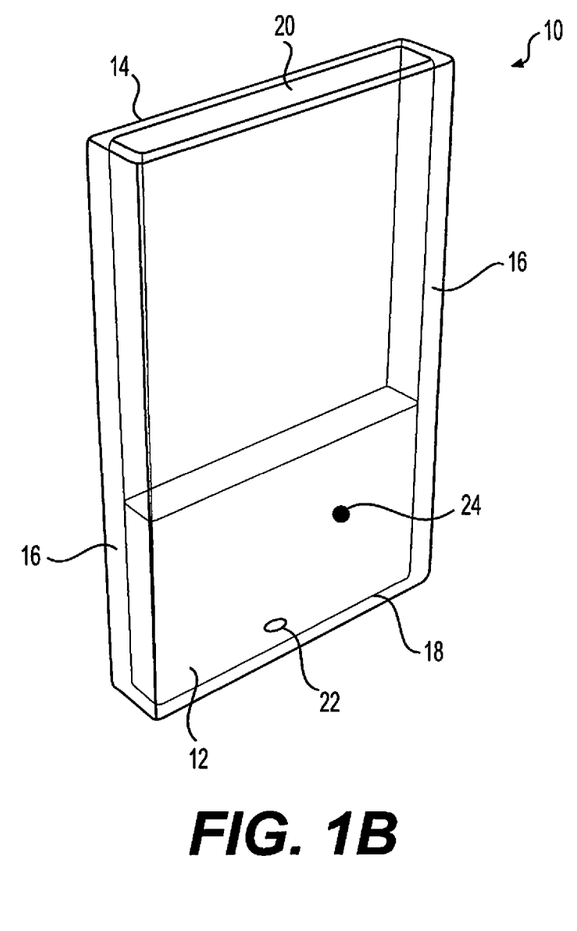

In FIG. 1 a first embodiment of a container of a liquid storage portion for an aerosol-generating system is depicted. The container 10 has a cubic shape and comprises a front wall 12, a rear wall 14, side walls 16, a bottom wall 18, and a top wall 20. The side walls are formed such that the internal volume of the container 10 has a narrow width of about 1 millimeter. The container 10 is dimensioned such that it has an internal volume of about 1 milliliter to about 1000 cubic millimeters. A dispensing opening 22 is provided in the bottom wall 18 of the container 10, through which the liquid aerosol-forming substrate 24 can be released to a vaporizer device (not shown). The liquid aerosol-forming substrate 24 has a viscosity of about 45 mPa-s such that liquid aerosol-forming substrate 24 is held near the dispensing opening 22 by capillary action.

In at least one example embodiment, all walls 12, 14, 16, 18, 20 of the container 10 are made from transparent material, such that the fill level of the liquid aerosol-forming substrate 24 can be monitored from the outside.

As shown in FIG. 1a, the container 10 is shown with a high fill level. Due to capillary forces the liquid aerosol-forming substrate 24 is not free to move within the container 10, but is held in a contiguous volume area that extends from the dispensing opening 22 into the inner volume of the container 10. Upon consumption of the liquid aerosol-forming substrate 24, the fill level continuously decreases. As shown in FIG. 1b the container 10 with reduced fill level is depicted. While the fill level decreases, the remaining content of the container 10 is always kept in a contiguous volume extending from the dispensing opening 22 in the bottom wall 18 of the container 10. The liquid aerosol-forming substrate 24 is held by capillary forces, and is therefore basically not affected by gravity. Thus, the liquid aerosol-forming substrate 24 remains in the contiguous volume area independent from the orientation in which the container 10 is held. If the container 10 is used in an aerosol-generating device, the vaper may check the remaining content of the container 10 at any time, without the need of positioning the aerosol-generating device in a desired or required orientation.

Figure 2A:
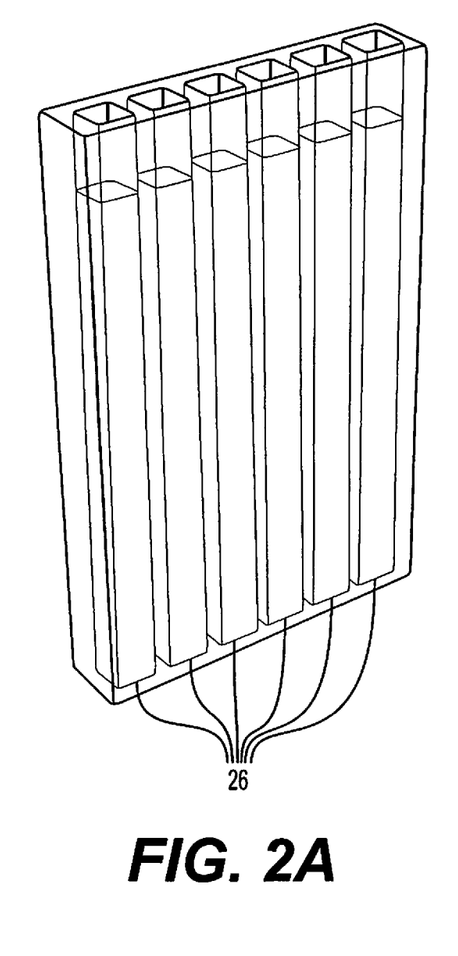
FIGS. 2a and 2b show liquid storage portion with a rectangular container having a plurality of parallel narrow channels according to at least one example embodiment.
Figure 2B:
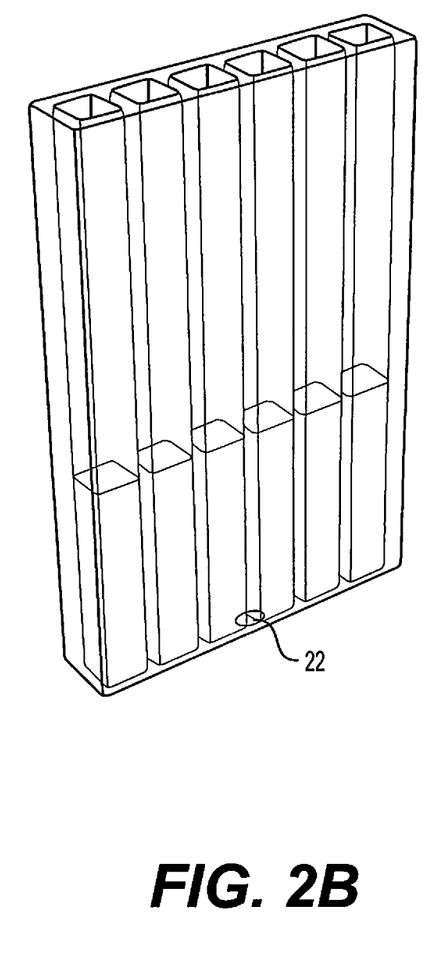

In FIGS. 2a and 2b a modification of the container of FIGS. 1a and 1b is depicted, in which the internal volume of the container 10 is further separated into a plurality of parallel capillary channels 26. The smaller the cross-sectional area of the internal volume of the container 10, the higher the capillary forces that act on the liquid aerosol-forming substrate 24 stored in the container 10. The parallel channels 26 are all connected to each other at the bottom side of the container 10. Again in the bottom wall 18 of the container 10 a dispensing opening 22 is provided through which the liquid aerosol-forming substrate 24 is released to a vaporizer device (not shown).

Figure 3A:
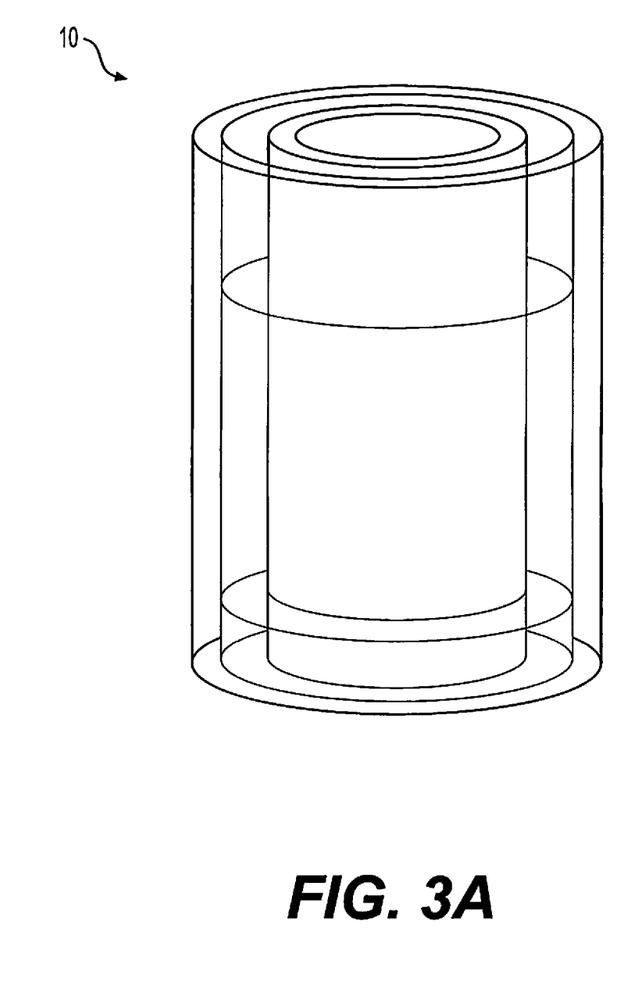
FIGS. 3a and 3b show liquid storage portion with a cylindrical container wherein the liquid is held in a section having narrow width according to at least one example embodiment.
Figure 3B:
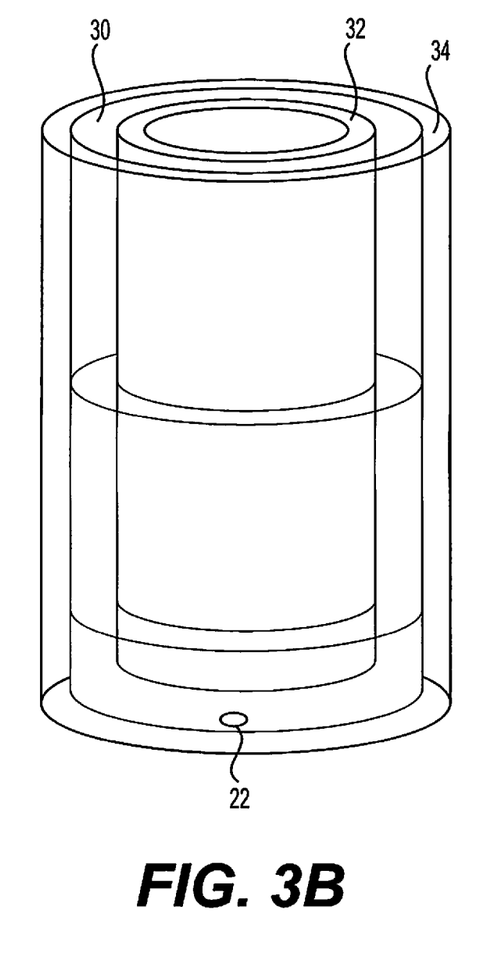

In at least one example embodiment, as shown in FIGS. 3a and 3b, the container 10 has a generally cylindrical shape. The liquid aerosol-forming substrate 24 is stored in the volume area 30 located between an inner cylindrical wall 32 and a concentric outer cylindrical wall 34. The distance between the concentric inner and outer cylindrical walls 32, 34 is sufficiently small such that the liquid aerosol-forming substrate 24 stored in the cylindrical container 10 is held by capillary forces. At the bottom side of the container 10 a dispensing opening 22 is provided through which the substrate 24 is released to a vaporizer device (not shown).

In at least one example embodiment, a distance between the concentric inner and outer cylindrical wall 32, 34 is about 1 millimeter. This leads to sufficiently high capillary forces, such that independent from whether the container 10 has a high fill level (FIG. 3a) or the container 10 has a low fill level (FIG. 3b), the liquid aerosol-forming substrate 24 is held in a contiguous volume area extending from the dispensing opening 22 at the bottom of the container 10.

Figure 4A:
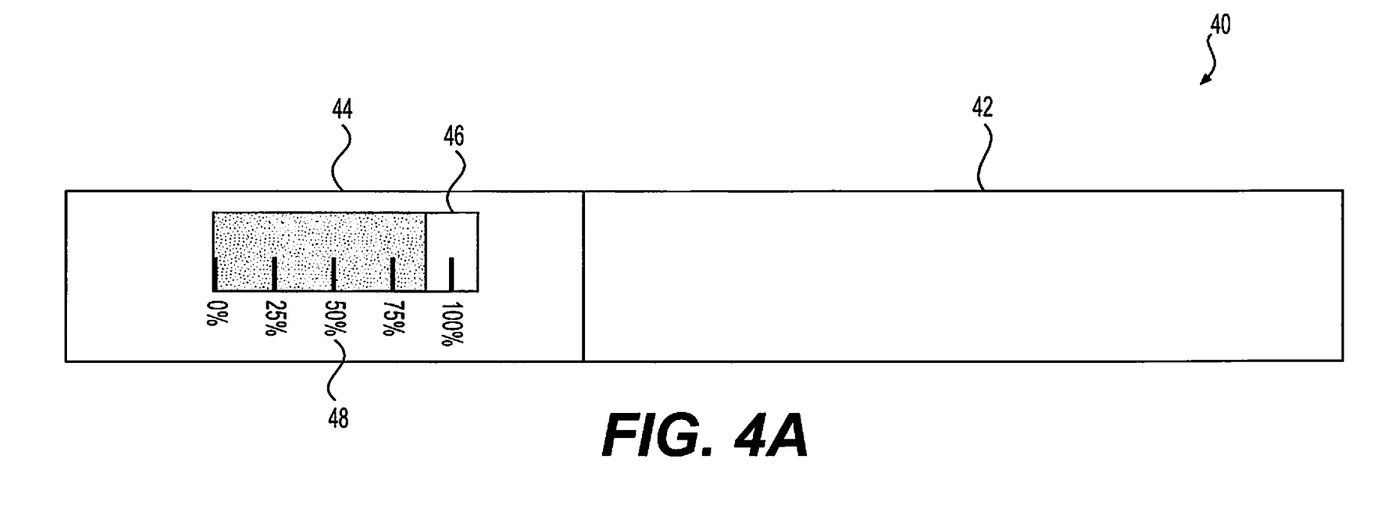
FIGS. 4a and 4b show an aerosol-generating system with a scale that extends over a part or the full length of the housing according to at least one example embodiment.
Figure 4B:
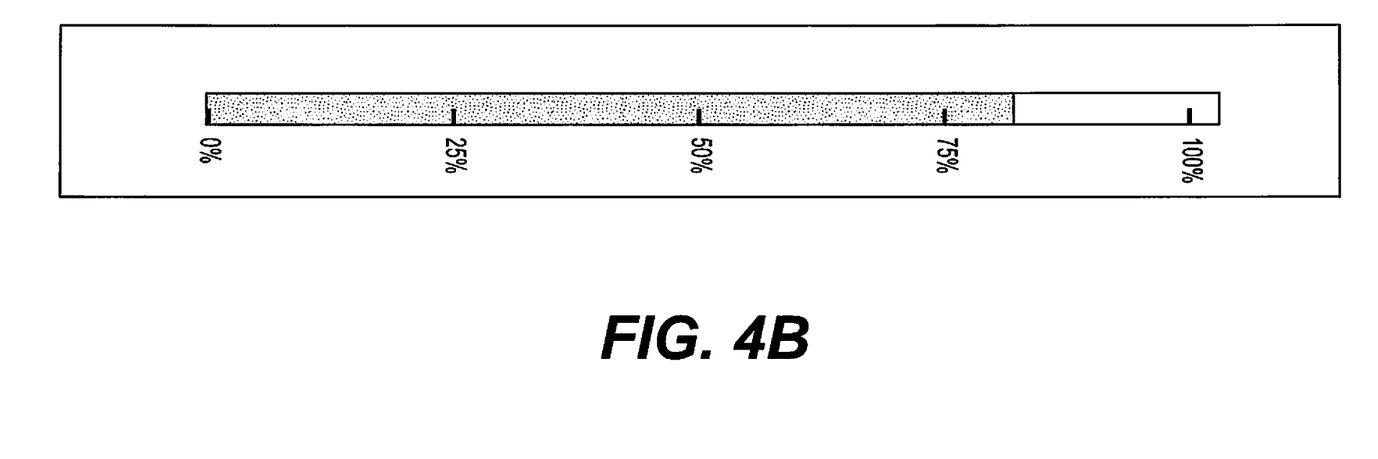

As shown in FIGS. 4a and 4b, two types of aerosol-generating devices 40 are schematically depicted. In FIG. 4a, cartomizer is depicted, which comprises a device part 42, including electronic circuitry and the power supply, and a replaceable cartridge part 44, comprising the liquid storage portion and the vaporizer assembly. The cartridge has transparent window 46 through which the fill level of the container 10 can be visually inspected. In order to increase readability of the remaining liquid content of the container 10, the transparent window 46 of the cartridge is provided with a scale 48.

In at least one example embodiment, as shown in FIG. 4b, an aerosol-generating device 40 with integral one-part housing is depicted. In this device the liquid storage portion may extend over the full length of the aerosol-generating device 40. This not only allows storing of an increased amount of aerosol-forming substrate 24, but also further enhances readability of the scale 48.

Figure 5A:
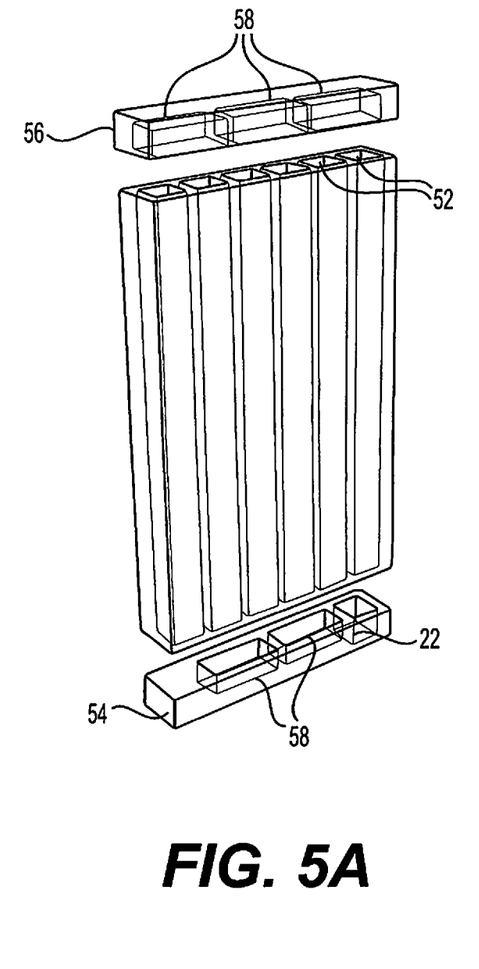
FIGS. 5a, 5b, 5c, 5d, and 5e show a liquid storage portion with central container portion and two end sections defining a single snaking capillary channel and a corresponding scale for determination of the fill level according to at least one example embodiment.
Figure 5B:
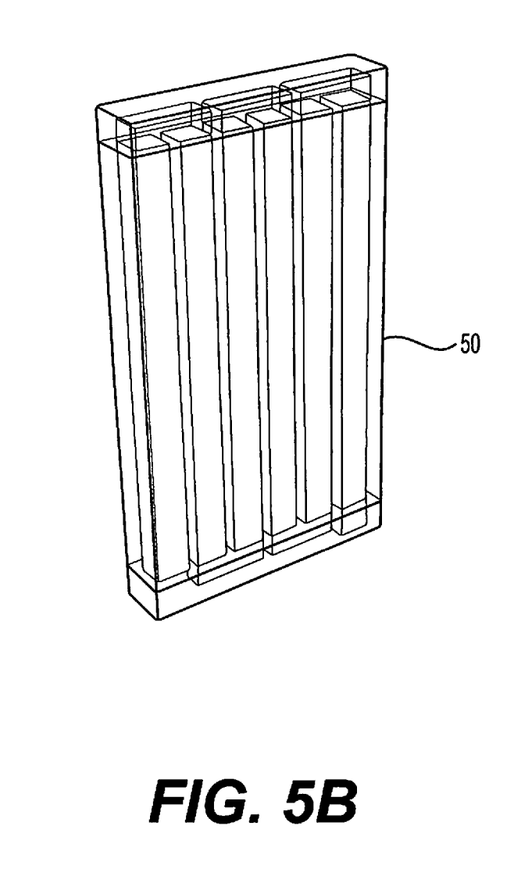

In at least one example embodiment, as shown in FIGS. 5a, 5b, 5c, 5d, and 5e, the container 10 comprises a central container portion 50 with a plurality of parallel channels 52 extending along the whole length of the central container portion 50. The container 10 further comprises two end sections 54, 56. As shown in FIG. 5a, these three elements are depicted in an exploded view. The end sections 54, 56 are attached to the central container portion 50 via gluing or ultrasonic welding, to form the container 10 as depicted in FIG. 5b. The end sections 54, 56 comprise recesses 58, by which adjacent parallel channels 52 are mutually connected to each other in series. The lower end portion 54 provides a dispensing opening 22 at its right-hand side through which the liquid aerosol-forming substrate 24 can be released. Further, when attached to the central container portion 50, the lower end portion 54 provides a closure for the outermost capillary cannel 52 provided at the left-hand side of the central container portion 50. When assembled the container 10 depicted in FIG. 5a features a single snaking capillary channel 60 in which the liquid aerosol-forming substrate 24 is held.

Figure 5C:
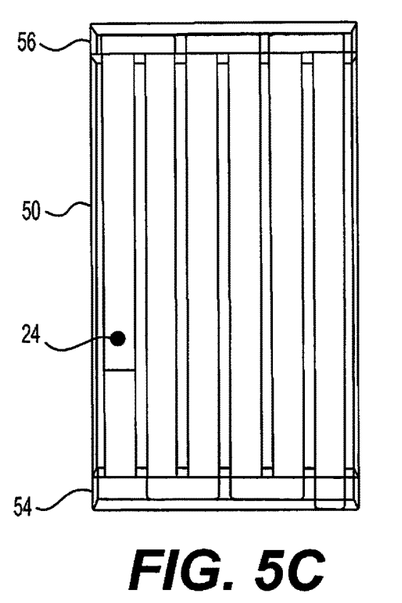
Figure 5D:
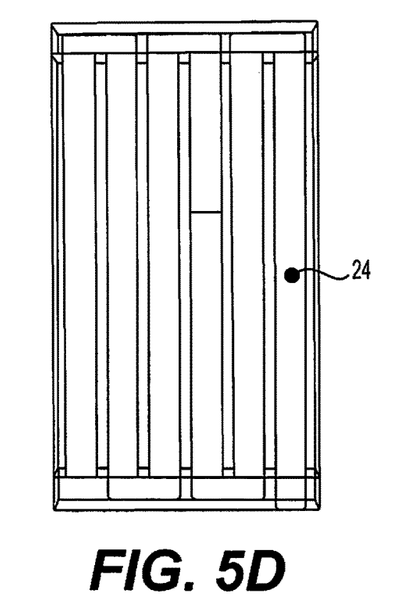

FIGS. 5c and 5d depict the container 10 of FIGS. 5a and 5b after being filled with liquid aerosol-forming substrate 24 (FIG. 5d) and after a part of the liquid aerosol-forming substrate 24 has been consumed (FIG. 5d).

Figure 5E:
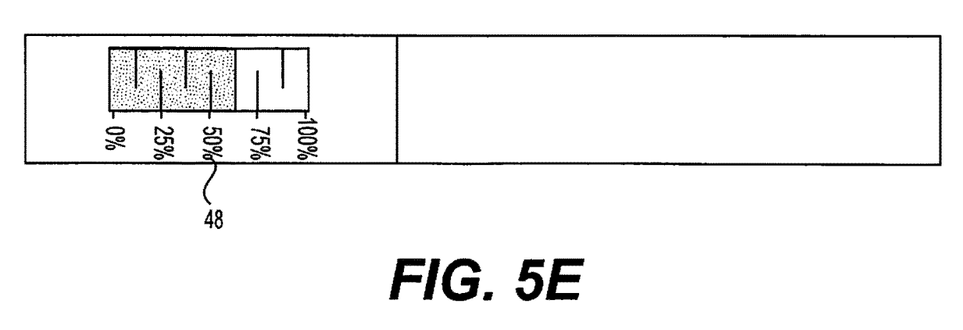

The snaking liquid path of the capillary channel 60 of the container 10 may also be reflected in the appearance of the scale 48 to be used with such containers 10. In FIG. 5e a scale 48 for a cartomizer design of an aerosol-generating device is depicted. The scale 48 follows the snaking liquid path and allows for a more precise reading of the fill level.

Figure 6A:
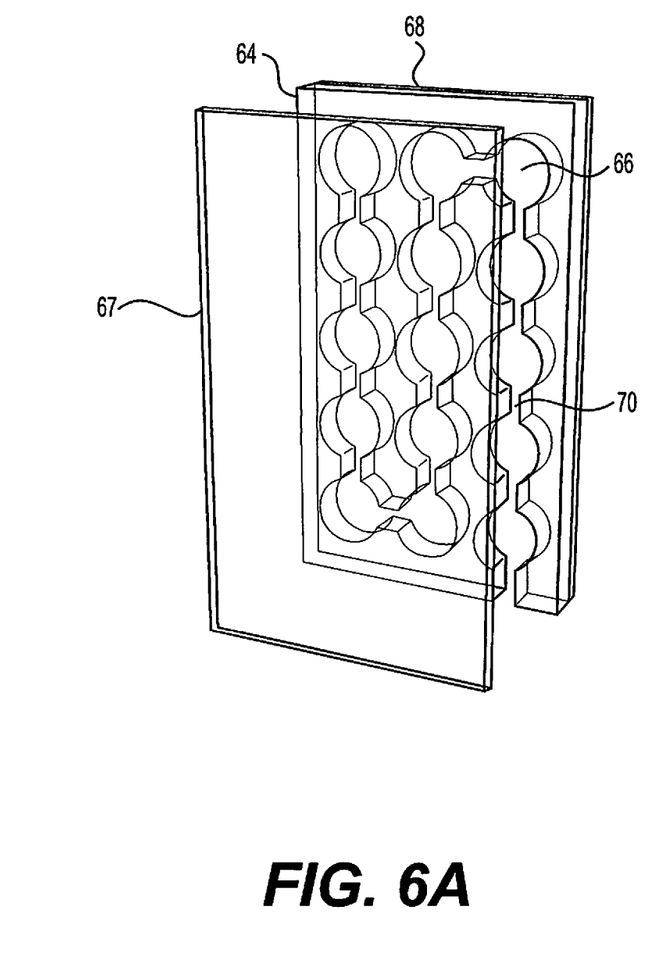
FIGS. 6a, 6b, 6c, and 6d show a liquid storage portion with central container portion and cover plates defining a single snaking capillary channel with enlarged pockets and a corresponding scale for determination of the fill level according to at least one example embodiment.
Figure 6B:
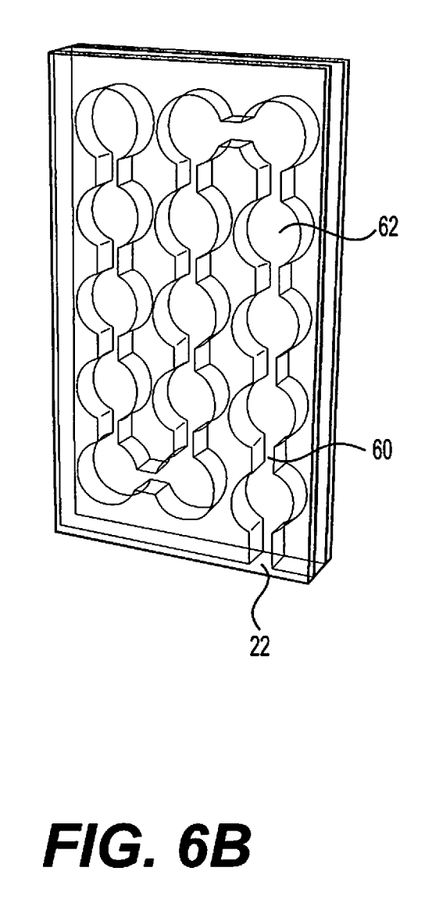

In at least one example embodiment, as shown in FIGS. 6a and 6b, the container 10 again comprises a snaking capillary channel 60. However, in order to increase the capacity of the container 10, enlarged pockets 62 are distributed over the length of the capillary channel 60. A convenient way to manufacture such container 10 is depicted. The container 10 again comprises a central container portion 64 defining the snaking channel in the form of a continuous slit 70 that extends from one side face of the central container portion 64. Along the snaking path circular through holes 66 are provided in the central container portion 64. By attaching cover plates 67, 68 to the front side and the back side of the central container portion 64, the container 10 as depicted in FIG. 6b is obtained. The liquid is released via dispensing opening 22.

Figure 6C:
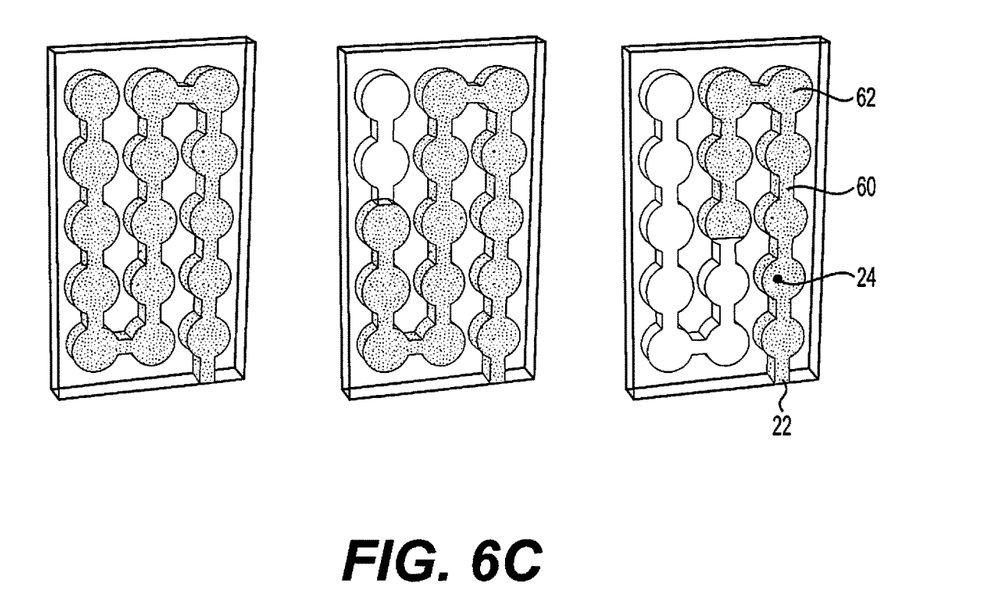

In at least one example embodiment as shown in FIG. 6c, the container of FIGS. 6a and 6b is depicted after being fully filled with liquid aerosol-forming substrate 24 (left-hand side of FIG. 6b) and after a part of the liquid aerosol-forming substrate 24 has been consumed (center and right-hand side of FIG. 6b). The capillary forces hold the liquid aerosol-forming substrate 24 in a contiguous volume area which decreases upon consumption of the liquid aerosol-forming substrate 24, but which always extends from the dispensing opening 22 of the container 10.

Figure 6D:
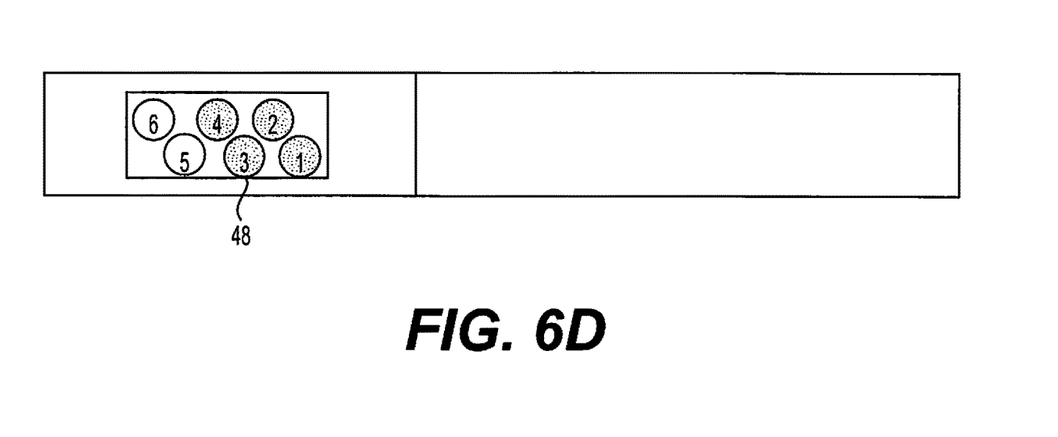

The amount of remaining liquid 24 can be easily determined by the consumer by simply counting the number of the filled pockets 62 of the container 10. A suitable scale 48 in this regard is depicted in FIG. 6d, which allows to see the pocket areas 62 only. The pocket areas 62 are depleted in sequential order and the consumer can readily determine the remaining liquid content by visually checking the amount of filled pockets 62 on the scale 48.

Figures 7A, 7B:
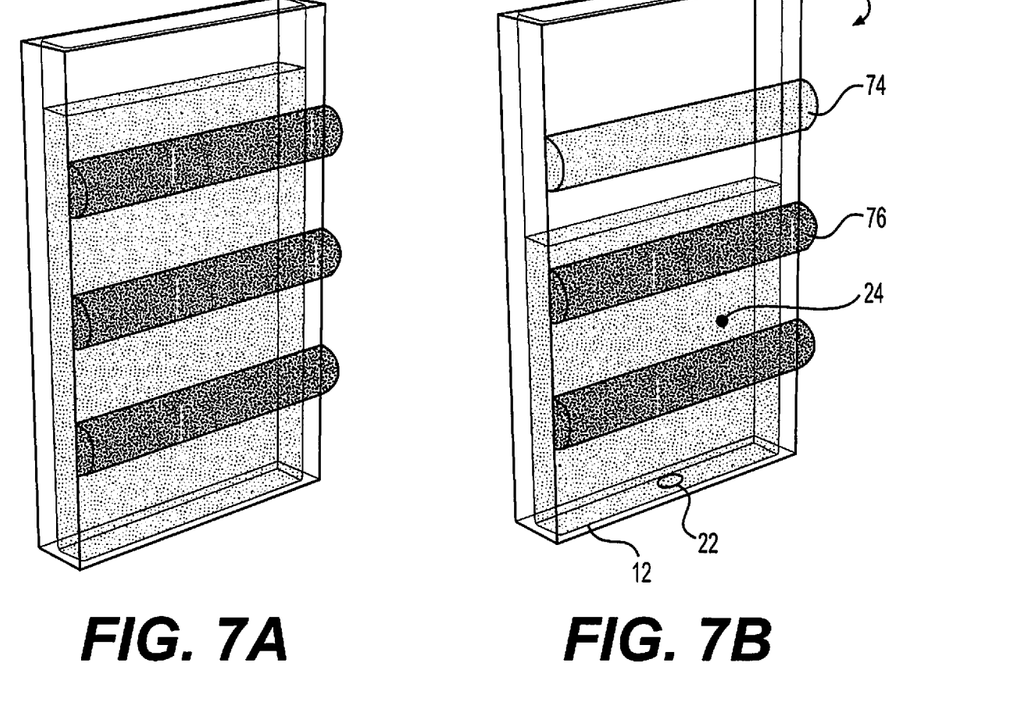
FIGS. 7a 7b, 7c, and 7d show a liquid storage portion with a rectangular container having narrow width and magnifying lenses for easy readability of the fill level according to at least one example embodiment.

In at least one example embodiment, as shown in FIGS. 7a and 7b, to increase readability of the scale 48 areas of magnification 74, 76 in the transparent sections of the container 10 may be provided. FIGS. 7a,7b, 7c, and 7d represents a modification of the example embodiment shown in FIGS. 1a and 1b. As shown in FIG. 7b, the transparent front wall 12 of the container 10 is provided with parallel half-cylindrical bars that are acting as magnifying lenses. As can be seen in FIGS. 7a and 7b these magnification areas 74, 76 produce an increased visible contrast, such that the consumer can more easily check the fill level of the container 10.

Figures 7C, 7D:
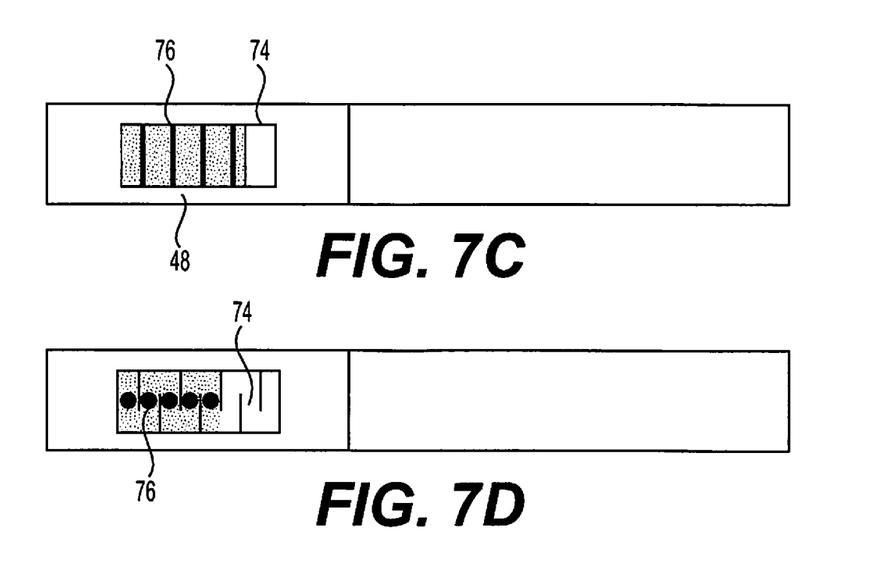

In at least one example embodiment, as shown in FIGS. 7c and 7d, the scales of FIGS. 4a, 4b, and 5e with magnification areas 74, 76 are depicted. The magnification areas 74, 76 can have any desired shape. In at least one example embodiment as shown in FIGS. 7c and 7d, the magnification areas 74, 76 are parallel stripes or small circular spots that are evenly distributed over the full length of the transparent window of the container 10. Those magnification areas 74, 76 which are located below the remaining fill level appear with a higher contrast and therefore help the consumer to recognize the fill level.

Figure 8:
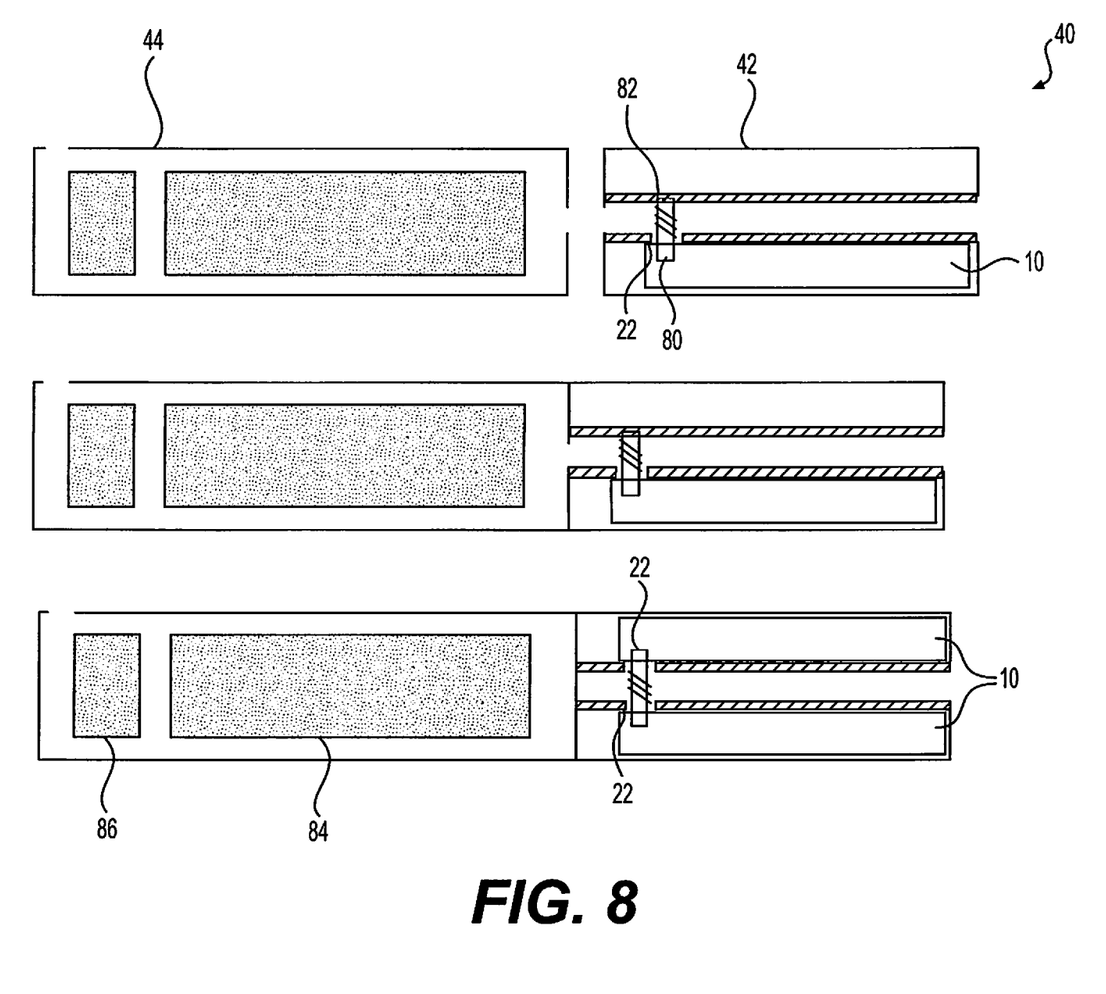
FIG. 8 shows various schematic embodiments of electronic cigarettes comprising a liquid storage portion according to at least one example embodiment.

In at least one example embodiment, as shown in FIG. 8, various example embodiments of aerosol-generating devices 40 incorporate a liquid container portion. The aerosol-generating devices 40 may generally be designed as a cartomizer in which the electronic circuitry 86 and the power supply 84 are located in the re-usable main device portion 44. The liquid container 10, the vaporizer 80, 82 and the mouthpiece are located in the cartridge portion 42. In these figures a so-called wick and coil atomizer assembly is employed in which the liquid aerosol-forming substrate is conveyed from the container 10 via a capillary wick 80 to an electric heater 82. In this embodiment the electric heater 82 is a coil of heating wire that is wrapped around a portion of the wick 80.

As can be seen in FIG. 8 the container 10 comprises a dispensing opening 22 at one end of the container 10. The wick 80 extends into the dispensing opening 22 of the container 10 and conveys the liquid aerosol-forming substrate via capillary action to the electric heater coil 82. The container 10 can also have two dispensing openings 22 and both ends of the wicks 80 can be inserted to these container openings 22 as depicted in the lower part of FIG. 8. However, it is important that these openings 22 are provided at the same end of container 10 such that the contiguous volume area in which the liquid aerosol-forming substrate is held extends from both openings 22. Of course the liquid container portion may also be used in connection with other e-cigarette designs, in particular with e-cigarettes 40 employing atomizer devices other than wick-and-coil arrangements.

The exemplary embodiments described above illustrate but are not limiting. In view of the above discussed exemplary embodiments, other embodiments consistent with the above exemplary embodiments will now be apparent to one of ordinary skill in the art.

I claim:

1. A method for manufacturing a liquid storage portion for an aerosol-generating system, the method comprising:

forming a container having an dispensing opening; and providing liquid aerosol-forming substrate to the container, the container being designed such that the liquid aerosol-forming substrate is held in a contiguous volume area of the container, and the aerosol-forming substrate in the contiguous volume is confined near the dispensing opening of the container independent from an orientation of the liquid storage portion;

providing a central container portion with a plurality of parallel channels extending along a whole length of the central container portion;

providing end sections; and attaching the end sections to the central container portion, such that adjacent parallel channels are linearly connected with each other, and a single serpentine liquid path is formed that extends continuously from the dispensing opening of the container.

2. The method of claim 1, wherein the container comprises at least a section having a width dimension such that the liquid aerosol-forming substrate is held by capillary forces in the contiguous volume area.

3. The method of claim 1, wherein the forming comprises: injection molding the container.

4. The method of claim 1, wherein the forming comprises: extruding the container.

5. A method for manufacturing a liquid storage portion for an aerosol-generating system, the method comprising:

forming a container having an dispensing opening; and providing liquid aerosol-forming substrate to the container, the container being designed such that the liquid aerosol-forming substrate is held in a contiguous volume area of the container, and the aerosol-forming substrate in the contiguous volume is confined near the dispensing opening of the container independent from and orientation of the liquid storage portion;

providing a central container portion defining a single liquid path and a plurality of enlarged pocket sections that are provided along a length of liquid path;

providing a front cover plate and a back cover plate; and attaching the cover plates to the central container portion, such that a container with a single capillary channel comprising a plurality of enlarged pockets is formed.

* * * * *